US012539509B2

(12) United States Patent
Bikmohammadi et al.

(10) Patent No.: US 12,539,509 B2
(45) Date of Patent: Feb. 3, 2026

(54) PIPETTE WITH ADJUSTABLE PIPETTING VOLUME AND LOCKING SYSTEM

(71) Applicant: Eppendorf SE, Hamburg (DE)

(72) Inventors: Julian Bikmohammadi, Hamburg (DE); Andreas Ratzka, Hamburg (DE); Elena Schmidt, Geesthacht (DE); Florian Tesch, Hamburg (DE); Christian Baasch, Großhansdorf (DE); Christiane Markau, Hamburg (DE); Michael Strutz, Neuendorf (DE); Anne Oehlmann, Hamburg (DE); Kevin Höricke, Hamburg (DE); Ulrike Gast, Ammersbek (DE); Olaf Sauer, Bad Gottleuba-Berggießhübel (DE)

(73) Assignee: Eppendorf SE, Hamburg (DE)

( * ) Notice: Subject to any disclaimer, the term of this patent is extended or adjusted under 35 U.S.C. 154(b) by 260 days.

(21) Appl. No.: 18/172,161

(22) Filed: Feb. 21, 2023

(65) Prior Publication Data

US 2023/0271174 A1 Aug. 31, 2023

(30) Foreign Application Priority Data

Feb. 25, 2022 (DE) ......................... 102022104546.3

(51) Int. Cl.
*B01L 3/02* (2006.01)

(52) U.S. Cl.
CPC ........... *B01L 3/0224* (2013.01); *B01L 3/0275* (2013.01); *B01L 2300/026* (2013.01)

(58) Field of Classification Search
None
See application file for complete search history.

(56) References Cited

U.S. PATENT DOCUMENTS 5,531,131 A * 7/1996 Sabloewski ........... B01L 3/0224 73/864.18
6,428,750 B1 8/2002 Rainen et al.
(Continued)

FOREIGN PATENT DOCUMENTS

DE 601 16 090 T2 7/2006
DE 10 2020 002 780 B3 10/2021
(Continued)

OTHER PUBLICATIONS

Japanese Office Action for JP Application No. 2023-027004 dated Jul. 2, 2024, with machine translation, 12 pages.
(Continued)

*Primary Examiner* — P. Kathryn Wright
(74) *Attorney, Agent, or Firm* — Grogan, Tuccillo & Vanderleeden LLP

(57) ABSTRACT

The invention relates to a pipette with a body for receiving a displacement device, the displacement device comprising a displacement chamber and a movable boundary element for bounding a pipetting stroke of the pipette. The pipette furthermore has an operating element for setting the pipetting volume of the pipette by movement of the boundary element in the body and for performing a pipetting operation, the operating element being in operative connection with a piston movable in the displacement chamber of the displacement device. The pipette furthermore comprises a counter for displaying the set pipetting volume and a locking mechanism for locking and/or unlocking volume setting by the operating element. It is provided that, on actuation of the operating element, the operating element is configured to perform a pipetting operation, to transfer the locking mechanism into a locked position and to lock adjustment of the pipetting volume.

10 Claims, 6 Drawing Sheets

(56) References Cited

U.S. PATENT DOCUMENTS

| | | | | |
|---|---|---|---|---|
| 7,175,813 | B2 | 2/2007 | Petrek et al. | |
| 9,630,174 | B2 | 4/2017 | Sarna et al. | |
| 2005/0039550 | A1 | 2/2005 | Uldry et al. | |
| 2007/0014696 | A1 * | 1/2007 | Molitor | B01L 3/0224 422/400 |
| 2013/0291660 | A1 * | 11/2013 | Wilmer | B01L 3/021 73/864.13 |
| 2018/0250667 | A1 | 9/2018 | Dudek et al. | |
| 2022/0016618 | A1 | 1/2022 | Kunsch et al. | |
| 2023/0001403 | A1 * | 1/2023 | Kneucker | B01L 3/0237 |

FOREIGN PATENT DOCUMENTS

| | | | |
|---|---|---|---|
| DE | 20 2021 101 129 | U1 | 7/2022 |
| EP | 2 659 978 | A1 | 11/2013 |
| EP | 3 749 456 | | 12/2020 |
| JP | 2004-509731 | A | 4/2004 |
| JP | 2007-516836 | A | 6/2007 |
| JP | 2013-503032 | A | 1/2013 |
| JP | 2016-052657 | A | 4/2016 |
| JP | 2018-532588 | A | 11/2018 |
| JP | 2022-018092 | A | 1/2022 |
| WO | WO 2019/202246 | A1 | 10/2019 |

OTHER PUBLICATIONS

Office Action of DE 10 2022 104 546.3, Oct. 29, 2022, 9 pages.
Japanese Office Action for JP 2023-027004 dated Oct. 31, 2024, with machine translation, 10 pages.
CN Office Action issued for CN counterpart application No. CN 202310168020.9, dated May 1, 2025.

* cited by examiner

PIPETTE WITH ADJUSTABLE PIPETTING VOLUME AND LOCKING SYSTEM

CROSS-REFERENCE TO RELATED APPLICATION

This application claims priority to German Patent Application Number 102022104546.3, filed on Feb. 25, 2022, the entire content of which, is incorporated herein by reference.

The invention relates to a pipette with an adjustable pipetting volume and a locking system for locking the set pipetting volume according to the preamble of claim 1.

Pipettes are used in particular in a laboratory setting for controlled drawing up and delivery of liquids. To this end, a pipette tip with an upper opening is firmly clamped onto a pipette seat. The seat is preferably formed as a conical or cylindrical projection on the pipette body. The pipette tip can draw up and deliver liquid through a lower opening. Air displacement pipettes comprise a displacement device for air which is in communicative connection with the pipette tip through a hole in the seat. By way of the displacement device, an air cushion is moved such that liquid is aspirated into the pipette tip and expelled therefrom. To this end, the displacement device has a displacement chamber with a movable boundary element. The displacement device is usually a cylinder with a piston movable therein.

After use, the pipette tips are detached from the seat and replaced with a fresh pipette tip. In this way, contamination of subsequent dispensing operations can be avoided. Pipettes usually have an ejection device for ejecting pipette tips which enables ejection by actuation of a button without the pipette tips being touched. Single-use pipette tips made of plastics are inexpensively available.

The movable boundary element is coupled with a drive device which serves to displace the piston in the cylinder. The drive device has a lifting rod which is displaceable with a limit stop element between an upper and a lower limit stop. At the start of air aspiration into the displacement chamber, the limit stop element is located at the lower limit stop. At the start of air displacement from the cylinder, the limit stop element is located at the upper limit stop an. The volume of liquid drawn up or delivered depends on the stroke of the movable boundary element and thus on the stroke of the lifting rod.

Systems for blocking the adjustment of a set pipetting volume, also known as a "volume lock", are known in principle from the prior art. However, hitherto known solutions have various disadvantages. There are volume lock systems in which volume setting has to be unlocked and actively relocked once the volume has been set. There is a risk that locking of the volume setting will be neglected or forgotten and that the set pipetting volume will be unintentionally adjusted during pipetting.

Other volume lock systems require an operating element to be pressed throughout the volume setting process so that volume setting is unlocked. While this variant does indeed prevent unintentional adjustment of the set pipetting volume highly reliably, the pipette has to be operated with two hands in order to keep the unlocking element pressed in while the volume is set.

Other volume lock systems can be unlocked in that the operating button is pulled up into a latched engagement. On pipetting, this latching engagement is disengaged and volume setting is locked again. This system also requires two-handed operation to hold the pipette with one hand and pull up the operating button with the other. There are also pipettes in which the volume lock can be unintentionally activated when the operating button is rotated for setting the pipetting volume. Furthermore, according to user feedback, it is not intuitive for the operating button to also be used for unlocking volume setting.

EP 2 659 978 A1 discloses an air displacement pipette with an adjustable pipetting volume and a locking element for locking the set pipetting volume. The pipette has a rod-shaped body, a seat for releasably holding a pipette tip at the lower end of the body and a displacement device with a displacement chamber and a boundary element movable therein. The pipette furthermore has a drive device for moving the movable boundary element of the displacement device and a locking body with which the drive device is lockable against unwanted adjustment of the set pipetting volume.

EP 3 749 456 B1 discloses a device for locking a volume adjustment screw for a pipetting system. The device for locking a volume adjustment screw for a pipetting system comprises on the one hand a jaw clutch system for holding the position of the volume adjustment screw, the pipetting system having the following:

- a first gearwheel comprising first teeth,
- a second gearwheel comprising second teeth, the first gearwheel being a ratchet wheel which is intended to be non-rotatable with regard to a stationary part of the pipetting system, and the second gearwheel is intended to be torsionally rigidly connected to the setting screw, or vice versa,
- elastic return means which are capable of bringing the first and the second gearwheels back into mutual engagement so that the first teeth cooperate with the second teeth, and a system for controlling the jaw clutch holding system, the control system having the following:
- a position selector designed to be moved rotationally according to a longitudinal center axis of the pipetting system between three positions, namely a free setting position, a fine setting position and a locking position,
- a control member torsionally rigidly connected to the position selector, the control member cooperating with the locking wheel of the jaw clutch system, such that:

a) when the selector is in the free setting position, the control member keeps the ratchet wheel axially spaced from the other wheel of the jaw clutch system by counteracting the force generated by the elastic return means, such that the first and second teeth do not cooperate with one another, b) when the selector is in the fine adjustment position, the control member allows the ratchet wheel to move away from and then to approach the other wheel axially on transition from one from one tooth to the other brought about by the rotation of this other wheel, and c) when the selector is in the locking position, the control member axially locks the ratchet wheel in order to prevent the first and second teeth from disengaging.

DE 601 16 090 T2 discloses a pipette with rapid volume adjustment for the set pipetting volume. The pipette comprises an axially elongate, hand-holdable body which has an electronic digital display and an associated position detection and control circuit, a piston unit and a nominal volume rapid adjustment mechanism for simultaneously controlling the pipette's volume setting and the electronic display. The nominal volume rapid adjustment mechanism comprises a pipette volume-setting element for limiting upward movement of the piston unit within the body in order to define the volume setting for the pipette. The volume-setting element is supported for axial movement on the piston unit and is releasably fastened relative to the body by a locking mechanism operable by a pipette user. When the volume-setting element is released from the body, it is axially movable on and with the piston unit for rapidly setting the volume of the pipette.

DE 10 2020 002 780 B3 discloses a pipette with a cylinder and a piston which is axially displaceably arranged in the cylinder. An axial movement of the piston is here limited by an upper limit stop and a lower limit stop, such that a piston stroke is defined. The pipette has a volume display for displaying a pipetting volume associated with the piston stroke. The pipette has a display-setting mechanism for changing the volume display. The pipette has an adjustment display for displaying an adjustment of the pipette via the volume display. The pipette has a volume-setting mechanism for changing the piston stroke. In a first operating mode of the pipette, the volume-setting mechanism is coupled with the display-setting mechanism. In a second operating mode of the pipette, the volume-setting mechanism is decoupled from the display-setting mechanism, and the display-setting mechanism is coupled with the adjustment display.

DE 20 2021 101 129 U1 furthermore discloses a pipette for drawing up and delivering fluid volumes. The pipette comprises a displacement device with an end piece, the end piece being configured for releasably mounting a pipette tip. The pipette furthermore comprises an ejector device for releasing and ejecting a pipette tip mounted on the end piece from the pipetting device, the ejector device having an ejector means and an actuation means for actuating the ejector device. The actuating means is here adjustable from a rest position into an actuation position by actuation, the ejector device being configured such that, by adjustment of the actuating means from the rest position into the actuation position, the ejector means is movable relative to the end piece into an ejection position and a pipette tip mounted on the end piece is movable relative to the end piece and finally ejectable from the pipetting device.

The object of the invention is to overcome the disadvantages known from the prior art and to propose an operating concept for a pipette which permits simple, intuitive one-handed operation while simultaneously reliably protecting the pipette user from undesired adjustment of the set pipetting volume.

The object is achieved by a pipette having a body for receiving a displacement device, the displacement device comprising a displacement chamber and a movable boundary element for setting the pipetting stroke of the pipette. The pipette further has an operating element for setting a pipetting volume of the pipette by movement of the boundary element in the body and for performing a pipetting operation, the operating element being in operative connection with a piston movable in the displacement chamber of the displacement device. The pipette furthermore comprises a counter for displaying the set pipetting volume and a locking element for locking and/or unlocking volume setting by the operating element.

According to the invention, on actuation of the operating element to perform a pipetting operation, the operating element is configured to transfer the locking element into a locked position and to lock adjustment of the pipetting volume.

Pipettes in which setting the pipetting volume, drawing up and delivering liquid and ejecting a pipette tip after a pipetting operation are controlled with just one operating element, in particular an operating button, are also known as single-button pipettes. Many users consider such pipettes particularly user-friendly since they can be straightforwardly operated with just one hand. Convenient one-handed operation can be achieved with the proposed pipette. The operating element can be pressed in the axial direction into the body of the pipette for drawing up and delivering a liquid. The operating element here has three actuation zones while it is being actuated and inserted in the axial direction. A first actuation zone serves for drawing up and delivering a liquid. Starting from an unloaded starting position, the operating element is pressed in the axial direction into the body of the pipette by for example 2 mm to 16 mm depending on the set pipetting volume.

The first actuation zone is followed by a second actuation zone, also denoted overstroke, which in particular serves to blow out any residual liquid from the pipette possibly still adhering to a pipette tip mounted on a receptacle on the body of the pipette after liquid delivery. This “overstroke” is effected by an additional movement of the operating element in the axial direction beyond the endpoint on drawing up liquid by for example a further 4 to 6 mm.

If the operating element is pressed further in the axial direction into the body, an ejector mechanism connected to the operating element pushes the used pipette tip from a receptacle on the body in a third actuation zone in order to eject the used pipette tip.

The actuation zones are preferably delimited from one another by a limit stop and an associated change in operating force in order to provide the user with sensitive feedback regarding the action currently being performed.

The pipette does, however, straightforwardly permit one-handed adjustment of the pipetting volume and protects the user from unintended and undesired adjustment of the pipetting volume once it has been set by activation of a volume lock, i.e. a lock on the adjustment mechanism for changing the volume on performance of a pipetting operation. In this context, performing a pipetting operation should be taken to mean actuation of the operating element, in particular of an operating button, in which the operating element for drawing up a liquid is pressed at least to such an extent that the pipette allows the set pipetting volume to be drawn up in its entirety, i.e. it strikes against a first limit stop, which represents the transition from the first actuation zone (drawing up liquid) to the second actuation zone (overstroke).

It is preferred for the locking mechanism to be transferred into the locked state, in which adjustment of the pipetting volume is prevented, at the latest when the overstroke of the pipette, i.e. the second actuation zone of the axial displacement of the operating element, is traversed.

The proposed pipette is therefore not only particularly convenient to use, but also straightforwardly enables a high level of operational reliability. The set pipetting volume can be locked by actuating the operating element before the liquid is drawn up. This may proceed both deliberately for locking the locking mechanism and in the course of an upcoming liquid drawing up operation in a “reverse pipetting operation”. Alternatively, the set pipetting volume is locked during the first pipetting operation, in particular on delivery of the liquid in the context of a pipetting operation, when the operating element is pressed into the second actuation zone of the overstroke.

Alternatively, the user can also actively return the locking mechanism to the locked operating state after setting the pipetting volume in that a locking element of the locking mechanism is placed by the operator into the locked switch position.

The features set out in the dependent claims enable advantageous improvements and further developments of the pipette stated in the independent claim.

A preferred configuration of the invention provides that the locking mechanism comprises a locking element for unlocking volume setting. A locking element can straightforwardly deactivate the locking mechanism such that the user can straightforwardly perform a volume adjustment.

It is particularly preferred for the locking element to take the form of a locking slide for unlocking volume setting. A locking slide can be particularly straightforwardly displaced in order to place the locking mechanism in the unlocked position and enable volume setting of the pipette.

An advantageous configuration of the pipette provides that latching means are provided which hold the locking mechanism in an unlocked switching position after an unlocking operation. Latching means result in particularly convenient operation, since the user does not have to actuate the locking mechanism throughout the setting operation, but can instead easily and functionally fix it temporarily and reversibly releasably in place in order to set the pipetting volume.

It is particularly preferred for the operating element to be in operative connection with a tripping means which releases the latching means on initiation of a pipetting operation and transfers the locking mechanism into the locked position. This provides a solution which is particularly simple and convenient for the user for locking the set pipetting volume after adjustment and securing it against a undesired adjustment.

A preferred embodiment of the pipette provides that the locking mechanism comprises a locking element and a connecting element which connects the locking element with a coupling element, the coupling element connecting the counter with a setting mechanism for moving the boundary element in the displacement chamber. Blocking the coupling element enables simple and functionally reliable locking of pipette volume adjustment such that the pipette is operationally reliably locked against undesired adjustment of pipetting volume.

In an unlocked position of the locking mechanism, it is preferred for the coupling element to transmit a rotational movement of the operating element for adjusting pipetting volume to the counter. This enables particularly simple operation of the pipette with one hand.

It is particularly preferred for the locking mechanism to engage form-fittingly in the coupling element and, via the form-fitting connection, to lock rotation of the operating element and any associated movement of the boundary element of the displacement chamber. A form-fitting connection can generate elevated locking forces which functionally reliably protect the pipette from undesired adjustment of the set pipetting volume.

One particularly advantageous configuration of the pipette provides that the form-fitting connection is provided by gear teeth on the locking mechanism engaging in gear teeth on the coupling element. Gear teeth can produce a particularly operationally reliable form-fitting connection which is advantageously suited to locking the coupling element and thus functionally reliably protects the pipette over its planned service life from undesired adjustment of pipetting volume.

A further advantageous configuration of the pipette provides that the locking mechanism comprises a locking element, the locking element or a component connected to the locking element being displaced in the axial direction along a longitudinal axis of the pipette in an unlocking direction during a locking operation. Axial displacement of the locking element can straightforwardly release a form-fitting connection of the locking mechanism with the coupling element, so enabling volume adjustment of the desired pipetting volume.

It is particularly preferred for the locking element or the component connected to the locking element to be axially displaced during a pipetting operation in a direction opposed to the unlocking direction and thereby lock volume adjustment of the pipette. A form-fitting engagement for locking volume adjustment can be straightforwardly produced by axial displacement and the pipette can thus be secured against undesired adjustment of pipetting volume.

A preferred embodiment of the pipette provides that the pipette comprises a rotary element and the locking mechanism comprises a locking element, the rotary element being in operative connection with the locking element in such a manner that the rotary element rotates into a travel path of the operating element when the locking element is brought into an unlocked position. Alternatively or additionally to the rotary element, it is also possible to provide a sliding element which is pushed into the travel path of the operating element when the locking element is brought into an unlocked position.

The travel path of the operating element should in particular be taken to mean the axial displacement path during a pipetting operation or a pipette tip ejection operation. Movement of the rotary element into the travel path of the operating element ensures that the locking mechanism is tripped on initiation of a pipetting operation and the set pipetting volume is locked against undesired adjustment.

It is particularly preferred for the rotary element and the locking element to be connected to one another via a slotted link mechanism. A slotted link mechanism enables particularly functionally reliable coupling of the rotary element with the locking element. Since a slotted link mechanism generally only permits displacement along a path defined by the slotted link, functional reliability can be increased and the service life of the pipette extended compared to other guidance concepts.

It is furthermore advantageous for the rotary element to be fastened to the body of the pipette by way of a shield. This enables particularly simple and inexpensive fastening of the rotary element. A shield additionally facilitates assembly because the shield or a prefabricated assembly connected to the shield and comprising the entire locking mechanism or at least parts of the locking mechanism can be inserted into an opening in the body or placed onto a collar on the body of the pipette and can thus be simply connected to the body.

An advantageous configuration of the pipette provides that the locking element is arranged in a recess in the body. This enables a particularly compact arrangement of the locking element for operation of the locking mechanism. In particular, it is provided that the locking element projects in the radial direction by no more than 5 mm, preferably by no more than 3 mm, beyond the outer diameter of the body. Because it projects slightly, the locking element is easy to find and actuate, the small protrusion of the locking element in the radial direction having no significant influence on the overall shape of the pipette.

A further advantageous improvement of the pipette provides that a finger hook is formed on the body, the locking mechanism being arranged on a side of the body opposite the finger hook. This enables particularly simple and convenient one-handed operation of the pipette. In particular, the pipette can be held by the finger hook while using the fingers of the same hand to place the locking mechanism in the unlocked position and then to set the pipetting volume by rotating the operating button.

An advantageous configuration of the invention provides that the locking mechanism comprises a return spring which is tensioned during an unlocking operation of the locking mechanism. In this way, on initiation of a pipetting operation, the locking mechanism can straightforwardly be returned to the locked position by the spring force of the return spring, such that the set pipetting volume is fixed from initiation of the pipetting operation and can no longer be adjusted during the pipetting operation.

A further advantageous configuration of the pipette provides that the locking element has a frame and an elastic tongue formed on the frame, there being provided on the elastic tongue a hook which projects radially inward beyond the elastic tongue. In an unlocked position of the locking mechanism, the hook here protrudes into a travel path of the operating button, such that, on actuation of the operating element during a pipetting operation, the hook is entrained by the operating element and displaces the locking element in the axial direction, such that a form-fitting connection between the locking element and the coupling element is produced, thereby locking volume adjustment of the pipette. In this way, volume adjustment of the pipette is particularly simply and operationally reliably transferred into a locked position by actuation of the operating element, such that unintended adjustment of the pipetting volume during pipetting is operationally reliably ruled out. The locking element is here preferably of one-piece construction, in particular in the form of a plastics injection molding. The locking element can alternatively also be of two- or multi-part construction, it in particular being possible to separate the components between the frame and the tongue of the locking element. The locking element can furthermore take the form of a two-component injection molding. In the case of a two-component injection molding, the frame is made of a first plastics material and the tongue from a second plastics material which differs from the first plastics material. In this way, in particular gear teeth on the locking element can be made appropriately flexurally rigid and mechanically loadable for form-fitting locking of rotational movement of the coupling element, while a deformation region of the tongue can be made appropriately flexurally soft and deformable.

It is particularly preferred here for a latching tab to be provided on the locking element, which latching tab is configured to engage in a recess on the body of the pipette or in a recess on a shield inserted into the body, such that the locking element is held in an unlocked position of the locking mechanism in which volume setting of the pipette is possible. A latching tab can achieve two positive effects. On the one hand, the latching tab can operationally reliably latch the locking element in an unlocked position such that the pipetting volume can be simply and conveniently adjusted once the lock has been released. Furthermore, radial displacement of the tongue of the locking element and thus of the hook can straightforwardly be achieved by the latching tab in combination with a recess on the body or a recess of a shield inserted into the body such that, when the latching tab is latched in place, the hook is located in the travel path of the operating element for pipetting and, when the latching tab is unlatched, it is moved in the radial direction outward by elastic deformation of the tongue such that, in this position, the hook is not in the travel path of the operating element and a pipetting operation can be carried out undisturbed.

A preferred configuration of the pipette provides that a locking slide is provided on the pipette, the locking slide bringing about on actuation an axial displacement of the locking element along a longitudinal axis of the pipette, such that a form-fitting connection between the locking element and a counterpart, in particular with a coupling element for the counter, is released and locking of the volume setting of the pipette is released. The locking slide enables simple unlocking of the volume adjustment of the pipette. To this end, the locking slide is displaced from the locked position into an unlocked position, wherein the locking slide displaces the locking element in the axial direction upward toward the operating element of the pipette, whereby gear teeth on the locking element are disengaged from locking teeth and the form-fitting connection between the gear teeth on the locking element and the locking teeth is released. In particular, a latching tab on the locking element may here be displaced in such a manner that said latching tab latches into place in a recess on the body or a shield inserted into the body, whereby the locking element is held in an unlocked position and the pipetting volume can be simply set.

The various embodiments of the invention mentioned in this application may advantageously be combined with one another, unless stated otherwise with regard to an individual case.

The invention is explained below in exemplary embodiments with reference to the accompanying drawings. Identical components or components with the same function are denoted with the same reference numerals in the various figures. In the drawings.

Figure 1:
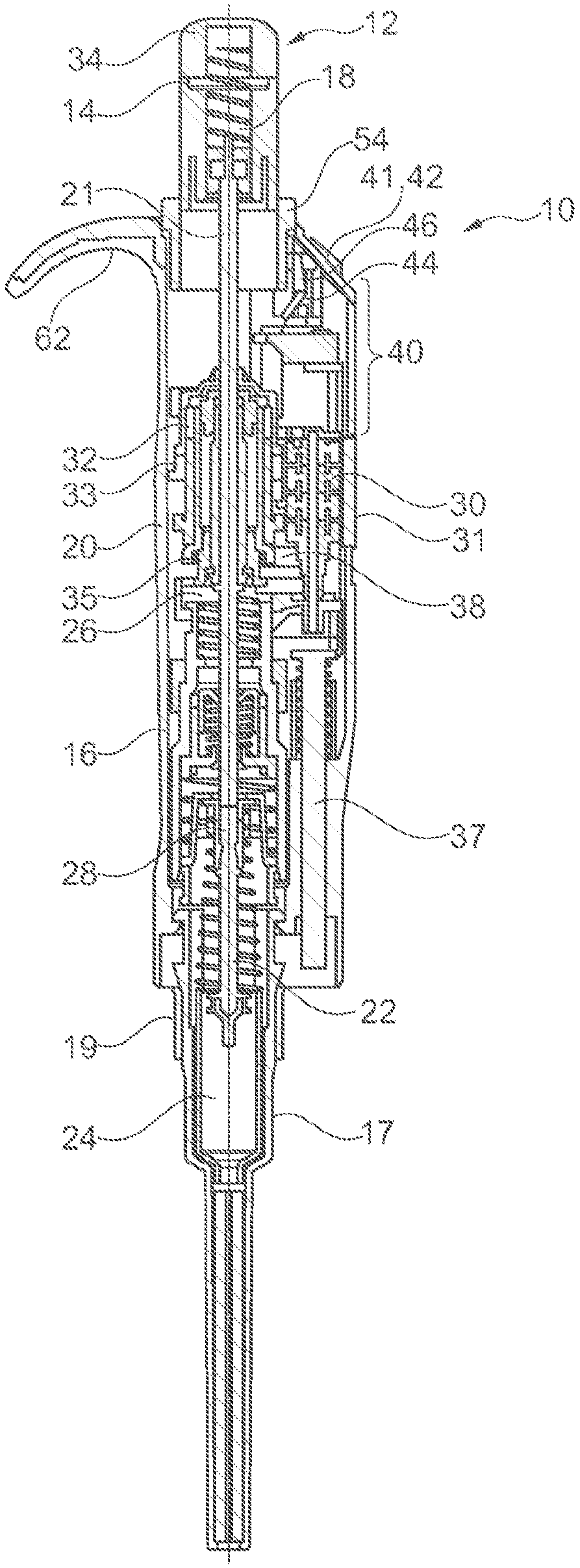
FIG. 1 shows a sectional representation of a pipette according to the invention with an adjustable pipetting volume and locking system for temporary and reversibly releasable locking volume setting of the pipette.

FIG. 1 shows a sectional representation of a pipette 10 according to the invention. The pipette 10 has a pipette upper part 16 and lower part 17 couplable to the pipette upper part 16. The pipette upper part 16 comprises a body 20, there being an operating element 12, preferably a round operating button 14, emerging through an opening in the body 20 on an end face of the body 20 remote from the pipette lower part 17. The operating element 12 has three functions. The operating element 12 firstly serves to set a pipetting volume as the volume of liquid which, during a pipetting operation, is to be drawn up by the pipette 10 and then delivered back out. The pipetting volume is set by rotating the operating element 12, the set pipetting volume being increased by rotation of the operating element 12 in a first direction of rotation and decreased by rotation in a direction of rotation opposed to the first direction of rotation. Depending on the design, the settable pipetting volume is between a minimum pipetting volume and a maximum pipetting volume. The operating element 12 secondly serves to draw up and subsequently deliver liquid during a pipetting operation, an operating button 14 of the operating element 12 being displaced in the axial direction along a center axis of the pipette. The operating element 12 thirdly serves to eject the used pipette tip from a receptacle on the pipette lower part 17 after a pipetting operation. All three functions are preferably combined in the operating button 14 such that operation can proceed simply and conveniently with just a single operating button 14. Alternatively, the function can also be divided among a number of components of the operating element 12 and in particular an additional button for ejecting a used pipette tip can be provided next to the operating button 14. It is furthermore possible for the operating element 12 to have an operating button 14 for drawing up and delivering the liquid and an element displaced by the operating button 14 for setting the pipetting volume.

The pipette 10 comprises a body 20 for receiving a displacement device 22, the displacement device 22 comprising a displacement chamber 24 and a movable boundary element 26 for bounding the pipetting stroke. The operating element 12 is configured for setting a pipetting volume of the pipette 10 by movement of the boundary element 26 in the body 20 and for performing a pipetting operation. The operating element 12 is in operative connection via a lifting rod 21 with a piston 28 movable in the displacement chamber 24 of the displacement device 22. The pipette 10 furthermore comprises a counter 30 for displaying the set pipetting volume and a locking mechanism 40 for locking and/or unlocking volume setting by the operating element 12. It is provided that, on actuation of the operating element 12, the operating element 12 is configured to perform a pipetting operation, to transfer the locking mechanism 40 into a locked position and to lock adjustment of the pipetting volume. A restoring spring 18 for the operating element 12 is furthermore provided in order to return the operating element 12 to the initial position once it has been relieved of load.

The locking mechanism 40 comprises a locking element 41 and a locking slide 42 for unlocking the locking mechanism. The locking mechanism 40 furthermore comprises a latching element 44 with which the locking slide and/or the locking element 41 can be temporarily fixed in an unlocked switch position in order to enable simple setting of pipetting volume by rotation of the operating element 12.

A transparent display window 31 is set into the body 20 to provide a view of the counter 30 from the outside and allow the set pipetting volume to be read. A movable boundary element 26 for the lifting rod 21 is provided in the body 20, a shoulder on the lifting rod 21 resting against the movable boundary element 26 and thereby limiting the stroke of the piston 28. Pipetting volume is set by moving the boundary element 26.

The pipette lower part 17 comprises a displacement chamber 24, into which the piston 28 actuatable via the operating element 12 and connected to the lifting rod 21 extends. The pipette lower part 17 has a clamping zone 19 for receiving a pipette tip, wherein it is possible to detach the pipette tip from the clamping region 19 and thereby eject it by actuation of the operating element 12 via the ejector rod 37.

In order to change the pipetting volume of the pipette 10, the locking slide 42 of the locking mechanism 40 is first brought into an unlocked position. An unlocked position should be taken to mean a position of the locking mechanism in which rotation of the operating element 12 and an associated change of the pipetting volume are possible. Once the desired pipetting volume has been set, the operating element 12 is then actuated to perform a pipetting operation. Actuation of the operating element 12 should in this connection be taken to mean pressing the operating element 12 with an associated axial displacement of the operating element 12 along a longitudinal axis of the pipette 10. The longitudinal axis extends in the plane of the drawing from the top downward and leads from the operating element 12 through the pipette upper part 16 and the pipette lower part 17 down to a receiving opening at the end of the pipette lower part 17 remote from the upper part 16. On actuation, the path of the operating element 12 is divided in three actuation zones.

A first actuation zone serves for drawing up and delivering a liquid with the pipette and is also denoted stroke H. Starting from an unloaded starting position, the operating element 12 is pressed in the axial direction along a travel path into the body 20 of the pipette 10 by for example 2 mm to 16 mm depending on the set pipetting volume.

The first actuation zone is followed by a second actuation zone, also denoted overstroke, which in particular serves to blow out from the pipette 10 any residual liquid possibly still adhering to a pipette tip mounted on a receptacle on the body 20 of the pipette 10 after liquid delivery. This “overstroke” proceeds by an additional movement of the operating element 12 in the axial direction beyond the endpoint of the stroke H on drawing up liquid by for example a further 4 to 6 mm. In the overstroke zone, a tripping element of the locking mechanism 40 protrudes into the travel path of the operating element 12 such that the locking mechanism 40 is tripped and a form-fitting connection between the locking element 41 and the coupling element 32 is produced when the overstroke is activated by the operating element 12. Volume adjustment is thus locked from this point in time onward in the pipetting operation. Such a locking operation can either be performed before the liquid is drawn up in order to fix the set pipetting volume, or can be initiated during the pipetting operation, in particular when blowing liquid out after liquid delivery.

If the operating element 12 is pressed further in the axial direction into the body 20, an ejector mechanism connected to the operating element 12 pushes the used pipette tip from a receptacle on the body 20 in a third actuation zone in order to eject the used pipette tip. It is provided to this end that a tripping element is formed at an end of an ejector rod 37 of the ejector mechanism facing the operating element 12, which tripping element projects into the travel path of the operating element 12 and initiates ejection of the pipette tip when the operating element 12 is pressed beyond the limit stop of the overstroke further into the body 20 of the pipette 10.

The actuation zones are preferably delimited from one another by a limit stop and an associated change in operating force in order to provide the user with sensitive feedback regarding the action currently being performed.

Figure 2:
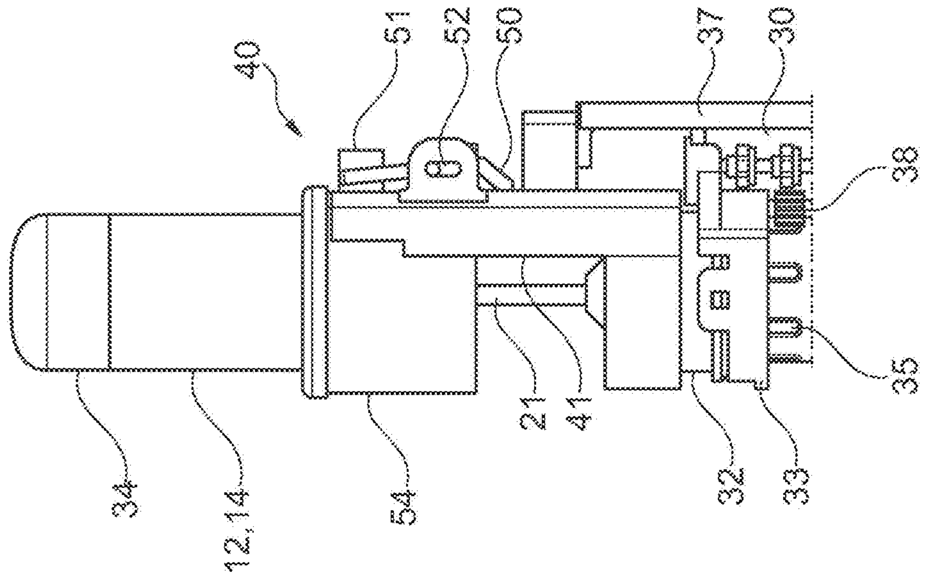
FIG. 2 shows a three-dimensional schematic representation of the operating element and locking system of a pipette according to the invention.

FIG. 2 is a schematic representation of the locking mechanism 40 of the pipette 10 for locking a set pipetting volume. The locking mechanism 40 comprises a locking element 41 which locks volume adjustment of the pipette 10 by the operating element 12, i.e. locks rotation of the operating button 14, in that the locking element 41 engages in form-fitting manner in the coupling element 32 and thus locks rotation. A slotted link mechanism 52, in which a rotary element 50 is guided, is formed on the locking element 41.

The rotary element 50 is fixed to a pivot point 51 on a shield 54 which is inserted into the opening at the end face of the body 20 and guides the operating element 12.

Alternatively to a rotary element 50 or in addition to a rotary element 50, a sliding element 58 may also be provided which is introduced into the displacement path of the operating element 12 and, on actuation of the operating element 12 in the context of a pipetting operation, i.e. by axial displacement of the operating element 12 by pressure on the operating button 14, is activated and pushes the locking element 41 in the axial direction into the coupling element 32 in order to form a form-fitting lock. A shoulder of the ejector rod 37 arranged at one end of the ejector rod 37 is furthermore located in the displacement path of the operating element 12 such that, once the operating element 12 has been displaced sufficiently far along the longitudinal axis of the pipette 10, a pipette tip received on the clamping zone 19 is ejected in known manner.

FIG. 2 furthermore shows an axle securing means 33 for securing an axle of the rollers of the counter 30 and a volume setting sleeve 35 together with a gearwheel 38 with which a rotational movement of the operating button 14 is transferable to the mechanism for moving the boundary element 26 shown in FIG. 1.

Figure 3:
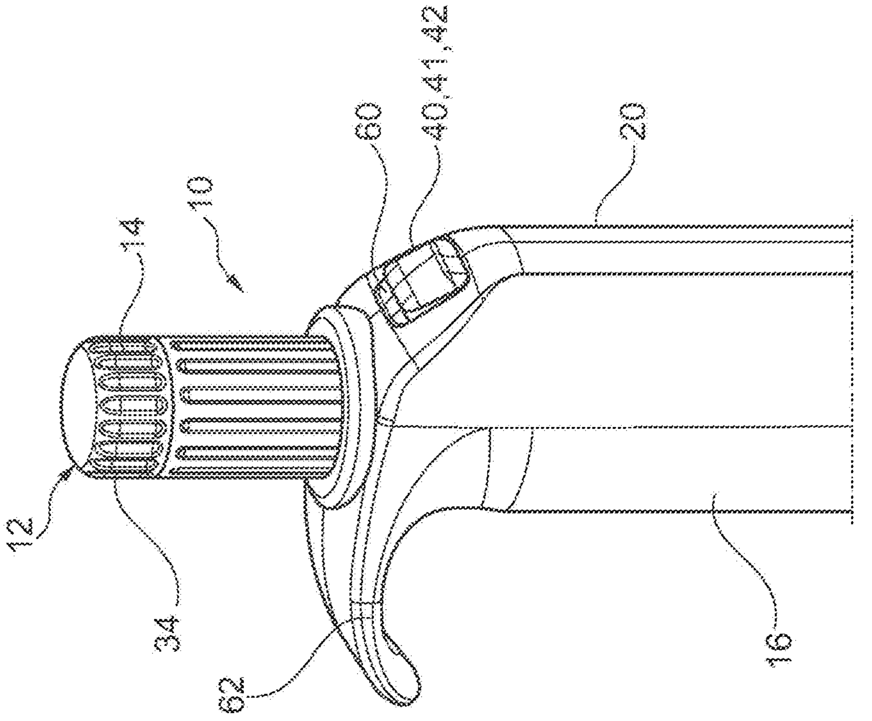
FIG. 3 shows a simplified representation of an upper part of a pipette according to the invention.
Figure 4:
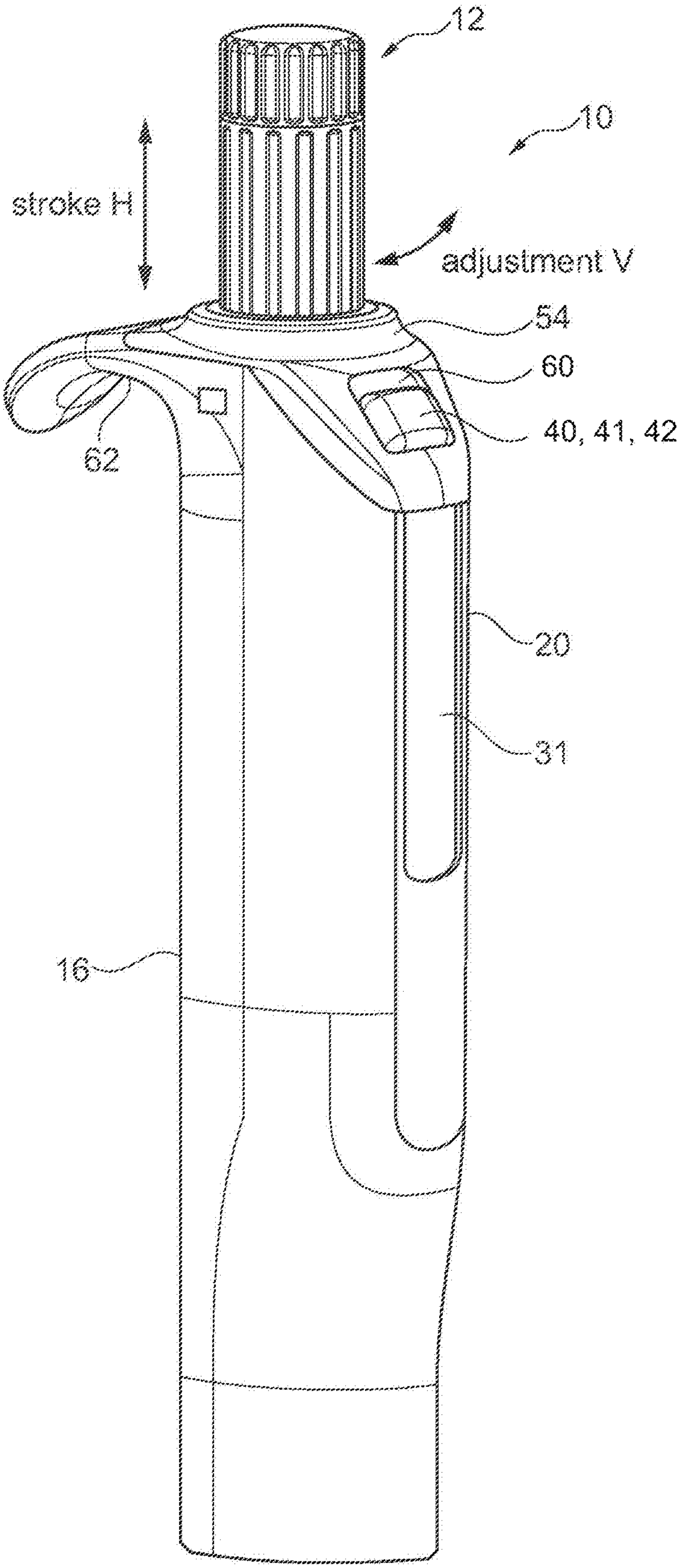
FIG. 4 shows an upper part of a pipette according to the invention in a three-dimensional representation.

FIG. 3 and FIG. 4 show a pipette upper part 16 of a pipette 10 according to the invention. It may be seen that a shield 54 is inserted in an opening in the end face of the body 20 and the operating element 12 in the form of the operating button 14 is guided through this shield. The operating element is displaceable in the axial direction along the center axis of the pipette over a stroke H and is rotatable about the center axis for adjustment of the pipetting volume V. A recess 60, in which a locking slide 42 of the locking mechanism 40 is arranged, is formed on the body 20 or on the shield 54.

A finger hook 62 is formed on the body 20 so that the user can hold the pipette 10 in one hand and operate it with this hand. When a hand is wrapped around the body 20, the finger hook 62 accordingly rests on the user's index or middle finger such the user can preferably use their thumb to selectively actuate the locking slide 42 or the operating button 14 in order either to set the pipetting volume or to perform a pipetting operation.

Figure 5:
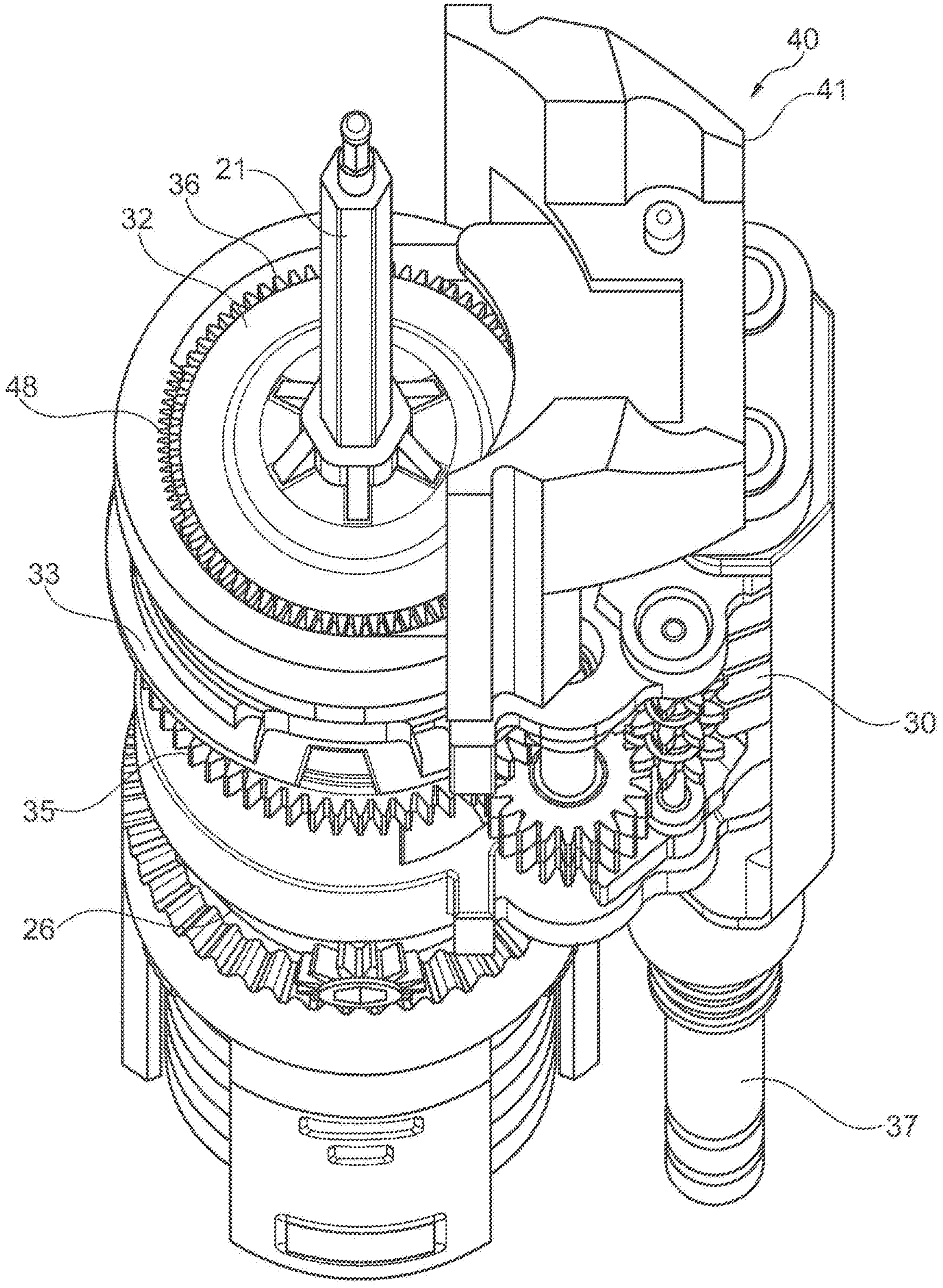
FIG. 5 shows a sectional representation through a locking mechanism in an upper part of a pipette according to the invention.

FIG. 5 shows a three-dimensional representation of the locking mechanism 40 arranged in the body 20 of the pipette 10. The locking mechanism 40 comprises a locking element 41 which can enter into operative connection with the coupling element 32 for coupling 30. To this end, gear teeth 48 are formed on the locking element 41 which, on axial displacement of the locking element 41 in the context of a locking operation, engage in gear teeth 36 of the coupling element 32 and thus form a locking form-fitting connection. While the gear teeth 36 are formed right around the circumference of the coupling element 32 and there is a comparatively large spacing between the individual teeth, the gear teeth 48 are formed on only a small circumferential range on the locking element 41 in order to permit fine latching engagement in this circumferential range. Manufacture of the locking element 41 is additionally simplified if the gear teeth are formed over only a small circumferential range, whereby manufacturing costs can be reduced.

As is apparent in FIG. 5, the lifting rod 21 preferably takes the form of a polygonal shaft, the coupling element 32 being pushed onto the lifting rod 21 and being form-fittingly connected therewith. Torque applied to the operating element 12 on volume adjustment can thus straightforwardly be transmitted to the coupling element 32. A polygonal shaft and an associated form-fitting connection between the lifting rod 21 and the components arranged on the lifting rod 21 additionally enable simple displacement of the movable boundary element 26 for setting the pipetting volume.

Figure 6:
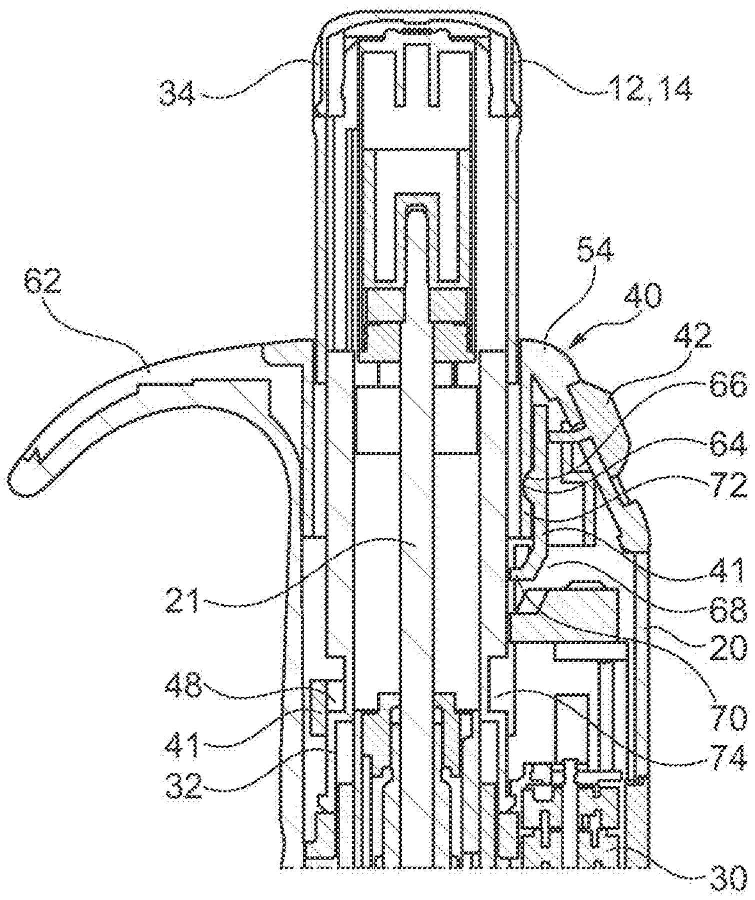
FIG. 6 shows an alternative embodiment of an operating element and of a locking system of a pipette according to the invention.

FIG. 6 shows an alternative exemplary embodiment of a locking system for temporary and reversibly releasable locking of a volume setting of the pipette 10. The locking system comprises a locking mechanism 40 with a locking element 41 which locks volume adjustment of the pipette 10 by the operating element 12, i.e. blocks rotation of the operating button 14, by gear teeth 48 on the locking element 41 engaging in form-fitting manner in gear teeth of the coupling element 32 and so blocking rotation. The locking element 41 comprises a frame 74 and an elastic tongue 68 projecting inward from the frame 74, on the end of which tongue a hook 70 is formed. A latching tab 64 is furthermore formed on this elastic tongue 68 in order to latch the locking mechanism 40 in an unlocked position and so allow the pipetting volume to be set. The locking mechanism furthermore comprises a locking slide 42 with which the locking element 41 can be transferred from the locked state into an unlocked state by sliding the locking slide 42 toward the operating element 12, i.e. upward in the depiction of the drawing. Displacement of the locking slide 42 disengages the locking element 41 from the coupling element 32 such that the pipetting volume of the pipette 10 can be set. The latching tab 64 formed on the locking element 41 here latches into a recess 66 on the shield 54 of the pipette 10 such that the hook 70 is advanced into a travel path of the operating element 12. If a new pipetting operation is carried out, the hook 70 of the locking element 41 is displaced downward in the depiction of the drawing by the operating element 12 and the gear teeth 48 on the locking element 41 are brought into engagement with the gear teeth on the coupling element 32 such that volume adjustment of the pipette 10 is locked. The latching tab 64 is here displaced from the recess 66 on the shield 54 on a surface 72 of the shield 54 such that the tongue 68 is elastically deformed and the hook 70 is bent out of the travel path of the operating element 12. In this way, the operating element 12 can be freely actuated while volume adjustment of the pipette 10 is locked.

Figure 7:
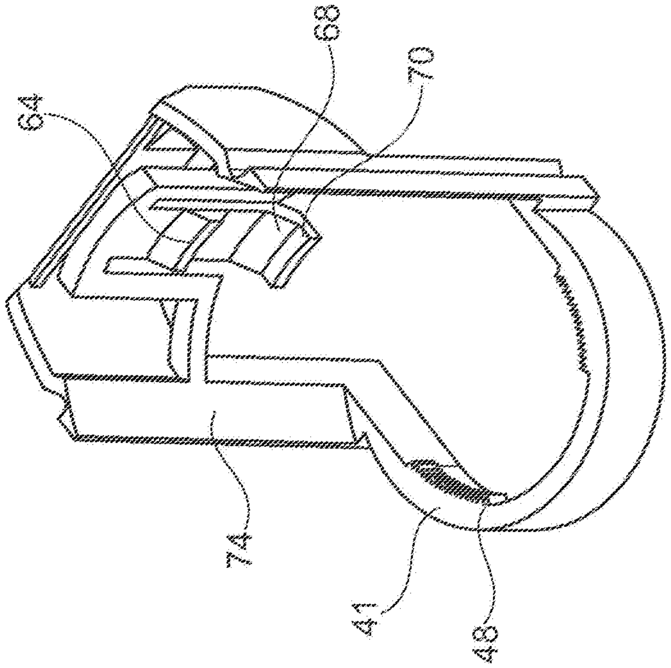
FIG. 7 shows a locking element of a locking system of a pipette according to the invention.

FIG. 7 shows an individual part drawing of the locking element 41 from the locking system shown in FIG. 6. The locking element 41 comprises a frame and an elastic tongue 68 projecting inward from the frame 74, on the end of which tongue a hook 70 is formed. Gear teeth 48 are furthermore formed on a lower annular portion of the locking element 41 in order to provide a form-fitting connection between the locking element 41 and the coupling element 32. A latching tab 64 is furthermore formed on the tongue 68, which tab, in an unlocked position of the locking system, latches into a recess 66 in the shield 54. If the locking element 41 is displaced toward the operating element 12 by actuation of the locking slide 42, the gear teeth 48 on the lower annular portion of the locking element 41 are no longer in engagement with the locking teeth on the coupling element 32, whereby setting of the pipetting volume is enabled by displacement of the boundary element 26 for the lifting rod 21.

Figure 8:
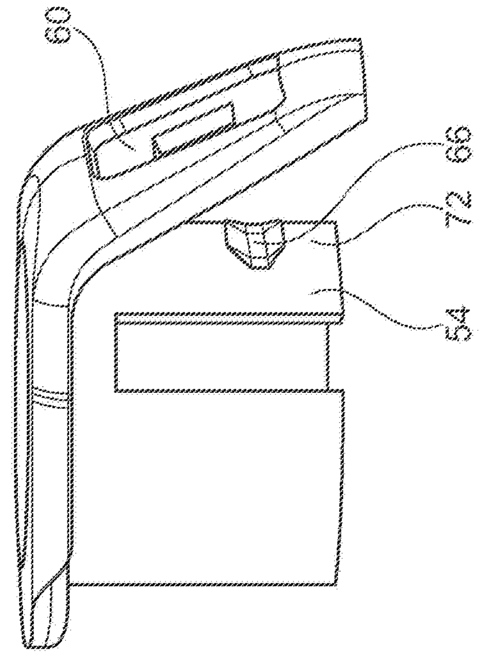
FIG. 8 shows a shield of a locking system of a pipette according to the invention in operative connection with the locking element.

FIG. 8 shows an individual part drawing of a shield 54 for the locking system of a pipette 10 shown in FIG. 6. It can be seen here that a surface 72 on the shield 54 and a recess 66 in the surface 72 are provided. If the latching tab 64 of the locking element 41 latches in the recess, the hook 70 on the locking element 41 protrudes into the travel path of the operating element 12 such that, on operation of the pipette 10, volume adjustment is transferred into the locked operating state.

LIST OF REFERENCE SIGNS

10 Pipette
12 Operating element
14 Operating button
16 Upper part
17 Lower part
18 Restoring spring
19 Clamping zone for pipette tip
20 Body
21 Lifting rod
22 Displacement device
24 Displacement chamber
26 Movable boundary element
28 Piston
30 Counter
31 Display window
32 Coupling element
33 Axle securing means
34 Setting mechanism
35 Volume setting sleeve
36 Gear teeth on coupling element
37 Ejector rod
38 Gearwheel
40 Locking mechanism
41 Locking element
42 Locking slide
44 Latching element
46 Connecting element
48 Gear teeth (on locking mechanism)
50 Rotary element
51 Pivot point
52 Slotted link mechanism
54 Shield
56 Return spring
58 Sliding element
60 Recess
62 Finger hook
64 Latching tab
66 Recess
68 Tongue
70 Hook
72 Surface on the shield
74 Frame
H Stroke by axial movement/pressure on the operating element
V Volume adjustment by rotational movement of the operating element

The invention claimed is:

1. A pipette (10) comprising:
a body (20) for receiving a displacement device (22), the displacement device (22) comprising
a displacement chamber (24) and
a movable boundary element (26) for bounding a pipetting stroke of the pipette (10),
an operating element (12) is configure to set the pipetting volume of the pipette (10) by movement of the boundary element (26) in the body (20) and the operating element is configured to perform a pipetting operation,
a piston (28) connected to the operating element (12) and configured to be moved in the displacement chamber (24) of the displacement device (22),
a counter (30) for displaying the set pipetting volume,
a coupling element (32) having gear teeth (36),
a lifting rod, wherein the coupling element is coupled to the lifting rod (21) and the operating element (21),
a locking mechanism (40) for locking and/or unlocking volume setting comprising;
a locking element (41), wherein the volume setting is determined by the operating element (12) by rotating the operating element (12) upon which the boundary element (26) is moved,
a connecting element (46) which connects the locking element (41) with the coupling element (32) which connects the counter (30) with a setting mechanism (34) for moving the boundary element (26) in the displacement chamber (24),
wherein, upon actuation of the operating element (12), the operating element (12) is configured to perform a pipetting operation, to transfer the locking mechanism (40) into a locked position and to lock adjustment of the pipetting volume by axial displacement of the operating element (12) which pushes the locking element (41) in the axial direction into the coupling element (32),
gear teeth (48) are formed on the locking element (41) which on the axial displacement of the locking element (41) engage in gear teeth (36) of the coupling element (32) and locks rotation of the operating element (12) and displacement of the boundary element (26) of the displacement chamber (24),
wherein an unlocked switching position of the locking mechanism (40), the coupling element (32) transmits a rotational movement of the operating element (12) configured to adjust the pipetting volume to the counter (30).

2. The pipette (10) according to claim 1, wherein characterized in that the locking element (41) is axially displaced on performance of a pipetting operation in a direction opposed to the unlocking direction and thereby locks volume adjustment of the pipette (10).

3. The pipette (10) according to claim 1, wherein characterized in that the pipette (10) comprises a rotary element (50) and the locking element (41), the rotary element (50) being in operative connection with the locking element (41) such that the rotary element (50) rotates into a travel path of the operating element (12) when the locking element (41) is brought into an unlocked position.

4. The pipette (10) according to claim 3, wherein the rotary element (50) and the locking element (41) are connected to one another via a slotted link mechanism (52).

5. The pipette (10) according to claim 3, wherein the rotary element (50) is fastened to the body (20) of the pipette (10) by way of a shield (54).

6. The pipette (10) according to claim 1, wherein characterized in that the locking element (41) is arranged in a recess (60) of the body (20).

7. The pipette (10) according to claim 1, wherein a finger hook (62) is arranged on the body (20), the locking mechanism (40) being arranged on a side of the body (20) opposite the finger hook (62).

8. The pipette (10) according to claim 1, wherein a locking element (41) has a frame (74) and an elastic tongue (68) formed on the frame (74), wherein, on the elastic tongue (68), a hook (70) is provided which projects radially inward beyond the elastic tongue (68).

9. The pipette (10) according to claim 8, wherein a latching tab (64) is provided on the locking element (41), which latching tab is configured to engage in a recess (66) on the body (20) of the pipette (10) or in a recess (66) on a shield (54) inserted into the body (20), such that the locking element (41) is held in an unlocked position of the locking mechanism (40) in which volume setting of the pipette (10) is possible.

10. The pipette (10) according to claim 8, wherein a locking slide (42) is arranged on the pipette (10), the locking slide (42) bringing about on actuation an axial displacement of the locking element (41) along a longitudinal axis of the pipette (10).

* * * * *